April 5, 1955
M. STEINBOOK
2,705,450
ROTARY ROASTER AND CORN POPPER
Filed May 19, 1954
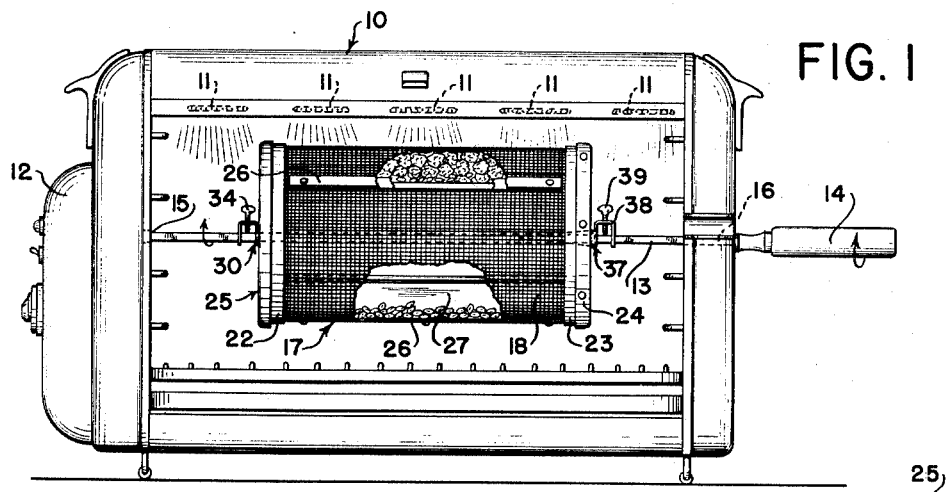
FIG. 1
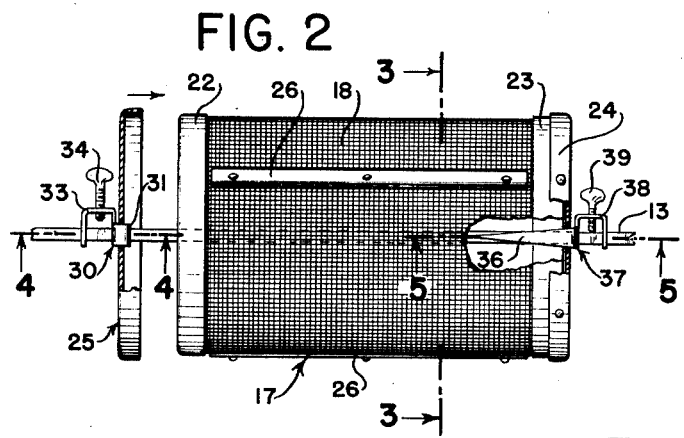
FIG. 2
FIG. 4
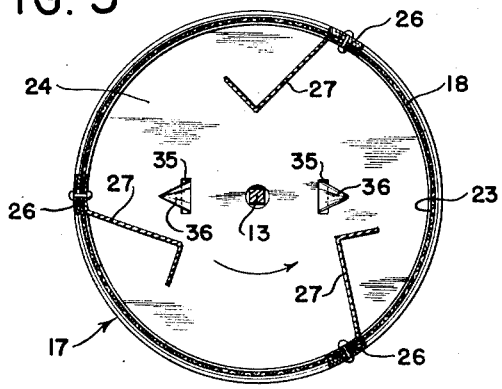
FIG. 3
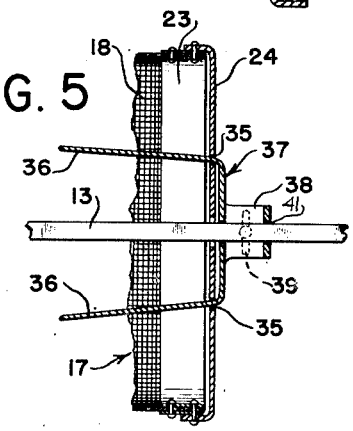
FIG. 5
INVENTOR
Max Steinbook
BY
ATTORNEY United States Patent Office 2,705,450
Patented Apr. 5, 1955

2,705,450

ROTARY ROASTER AND CORN POPPER

Max Steinbook, New York, N. Y., assignor to The Peerless Corporation, New York, N. Y., a corporation of New York Application May 19, 1954, Serial No. 430,849

1 Claim. (Cl. 99—238.1)

This invention relates to an accessory for a device commonly identified as a rotisserie type electric broiler, whereby such broilers may be adapted for use in certain types of roasting. The accessory is especially useful where the foodstuff to be roasted is not of such nature that it may be conveniently impaled upon the spit which is used in such broilers, for rotary roasting directly on such spit.

The rotisserie type electric broiler has come into great prominence in recent years doubtless because it furnishes the housewife with compact and convenient means for preparing dishes, which would otherwise have to be prepared in a full scale operation on a kitchen range. The form of such broilers usually is a box-like casing made of metal, with one side of the casing open. The opening serves both to permit insertion of food prepared into the casing and also provides visibility whereby the attendant may watch the progress in cooking within. Infrared heating elements are disposed within the casing, usually at the top. One way in which food may be prepared in such a device is to place it on a tray, which may be adjusted as to distance away from the heating source.

In addition, broilers of the type under discussion are fitted with a spit, which is designed to be rotated by a motor which is also part of the broiler, being included within a part of the casing. For rotation the spit frequently is driven by means which engage one end of the spit. The spit is removable, and in practice, is removed from the casing, loaded with footstuff, perhaps a roast or a chicken, which is mounted on the spit by passing the spit therethrough. Retaining skewers are clamped in place on either side of the footstuff, to fix the foodstuff in place, the spit reinserted into the casing, one end of the spit engaging the rotating means, and the heat turned on, whereupon cooking proceeds.

It will be appreciated that while a broiler may be suited for operation as above described, it may not be useful to cook items which by their nature are unsuited to being mounted on a spit. This is the case with foodstuffs too small in bulk to be pierced by the spit, as for example, popcorn, or of such a nature that it may not conveniently be so pierced, as for example, potatoes. And yet the technique of rotary cooking under a heat source commends itself especially to the preparation of such foods. This is so for the reason that they are best prepared by a uniform exposure to heat.

It is, therefore, the primary object of this invention to adapt a broiler for the cookery of foods of the class last referred to. The way in which this is done is to provide what amounts to a drum which may be mounted on the spit in much the same manner as above detailed for a roast. Popcorn or potatoes or other foodstuffs are placed within the drum, the drum capped, placed upon the spit, fixed in position thereon, the spit put into the casing, and electric current for heating and rotation turned on. The spit will then proceed to rotate beneath the heat source, and with it, the barrel or cylinder, which, during such rotation, will be in a horizontal disposition, that is, will be coaxial with the spit.

But it is obvious that if a cylinder is used, whose internal surface is smooth, or rather, uninterrupted, that the food therein will not be raised toward the heat source as the cylinder rotates, but will remain in the same locality of the cylinder, to wit, at the portion of the internal surface of the cylinder farthest from the heat source. Since this, of course, defeats the contemplated operation of the device, it is a further object of this invention to provide means for regularly raising the food within the cylinder toward the heat source as the cylinder rotates.

Another problem which must be faced with such a device has to do with mounting the cylinder on the spit. It is necessary that means be provided, and an object herein is to so provide, whereby the position of the cylinder relative to the length of the spit be fixed. If this is not done, there will be inconvenience in mounting the loaded spit within the broiler casing. Furthermore, there might be a shifting of the position of the cylinder during rotation if the spit is not exactly level, with an attendant irksome noise, as well as uneven exposure to heat.

How these and many other objects are to be implemented will become clear from a consideration of the accompanying drawings wherein:

Fig. 1 shows a device as here contemplated mounted in position within the casing of an electric broiler;
Fig. 2 shows an elevational view of such a device;
Fig. 3 is a section at 3—3 of Fig. 2;
Fig. 4 is a section at 4—4 of Fig. 2; and
Fig. 5 is a section at 5—5 of Fig. 2.

In Fig. 1 is shown an electric broiler of the type above referred to, having a casing 10, heating elements 11, and a driving motor not shown, within portion 12 of the casing. The spit 13, having handle 14, is mounted into the casing, at one end 15 being supported, the support not being shown, by a driving mechanism, which is driven by the motor above referred to, but not shown. The spit 13 is rotatably supported at its other end within slot 16 in the casing. The cylinder 17 is mounted on the spit, with a portion of the peripheral wall 18 being broken away to show the food 19 contained therein.

In the embodiment shown, the peripheral wall 18 of the cylinder is made of a fenestrated material, and there are bands 22 and 23 at either end of the cylinder. These bands coact with closure means for the cylinder. At one end, at band 23, the cylinder is permanently closed by cover 24, which may be riveted or otherwise joined to band 23. Closure at the other end is made removable in order that access means to the interior of the cylinder may be provided. This is accomplished by use of removable cover 25 which is so made that it may be friction fitted onto band 22.

There is secured at intervals to the outside of peripheral wall 18, strips 26, which extend in a direction parallel to the axis of the cylinder. These provide means whereby vanes 27 may be secured at the interior of the peripheral wall. It will be seen that these vanes serve as lifting means for the cylinder contents during rotary roasting. Their shape is such that the contents are lifted substantially to a position closest to the heating source during rotation of the cylinder, there being released to drop to the bottom of the cylinder. Three such vanes are present in the embodiment shown.

Clamping means are shown in conjunction with both cover 24 and removable cover 25. That conjoined with cover 24 is permanently secured thereto, being in form a bracket 30 having ends 31 which pass through apertures 32 in the cover. The ends 31 are bent over to hold the bracket fixed in place. A portion 33 of bracket 30 is U-shaped, and a wing screw 34 is threaded through a hole in the base of the U. When the cylinder is placed on the spit, the wing screw may be tightened down against the spit to aid in holding the cylinder in place on the spit. The fixing mechanism at the other end of the cylinder is substantially the same, but differs to the extent that the bracket is removable. It was earlier pointed out that roasts or chickens may be directly impaled on the spit for roasting. When this mode of operation is used, skewers are used, one being inserted into either end of the object and fixed in position by a wing screw. In the embodiment shown, such a skewer, which is a standard part of the broiler equipment, is utilized at the end of the cylinder closed by cover 24 to aid in fixing the position of the cylinder. Thus, there are apertures 35 in cover 24 into which ends 36 of the skewer 37 are inserted. As before, there is a U-shaped portion 38 of the skewer, having locking wing screw 39 threaded through the base thereof. When the cylinder is mounted on the spit, this wing screw too may be tightened against the spit, and thus, when both wing screws are tightened down, the cylinder is fixed securely, yet removably in place.

Means are further provided whereby the cylinder will rotate with the spit, when the latter is caused to rotate by its driving mechanism. To accomlish this, the spit 13 is of square cross section except for the handle 14. A square hole 40 is formed into one leg of U-shaped portion 33 of bracket 30. Similarly a square hole 41 is formed into one leg of U-shaped portion 38 of skewer 37. Thus, when it is desired to mount the cylinder on the spit, the spit is passed through holes 40 and 41 as well as the cylinder. Since holes 40 and 41 are made just large enough for the spit to pass therethrough, but not so large that the spit may rotate therein, it is obvious that the cylinder will turn with the spit.

While I have described a specific embodiment of my invention, it is apparent that changes and modifications may be made therein without departing from the spirit of my invention. For example, a non-perforated material might be used instead of that shown, or more or fewer vanes might be used.

I claim:

The combination of an electrically heated roaster having a rotatable spit, a hollow cylinder having a fenestrated wall and also having end covers each provided with a central perforation and with at least one end cover being provided with an eccentric perforation, said cylinder being removably mounted on the spit with the latter passing through the perforations of the end covers, and means for keying the cylinder to the spit for rotation therewith, said means comprising at least one skewer branching outwardly from the spit and having its outer end bent approximately into parallelism with the spit, said outer end passing through the eccentric perforation of said end cover.

References Cited in the file of this patent

UNITED STATES PATENTS

| | | |
|---|---|---|
| 940,557 | Roe | Nov. 16, 1909 |
| 983,549 | Greiner | Feb. 7, 1911 |
| 1,712,242 | Zimmerman | May 7, 1929 |
| 2,004,775 | Wright | June 11, 1935 |
| 2,085,169 | Prood | June 29, 1937 |
| 2,324,298 | Grupe | July 13, 1943 |
| 2,565,967 | Jones | Aug. 28, 1951 |
| 2,682,830 | Kupchik | July 6, 1954 |

FOREIGN PATENTS

| | | |
|---|---|---|
| 201,802 | France | Nov. 8, 1889 |
| 210,036 | Great Britain | Sept. 18, 1924 |